(12) United States Patent
Vasshus et al.

(10) Patent No.: US 8,025,152 B2
(45) Date of Patent: Sep. 27, 2011

(54) SIEVE APPARATUS AND METHOD FOR USE OF SAME

(75) Inventors: Jan Kristian Vasshus, Sandnes (NO); Trond Melhus, Sandnes (NO); Harald Knutsen, Bryne (NO)

(73) Assignee: Virdrill AS, Sandnes (NO)

( * ) Notice: Subject to any disclaimer, the term of this patent is extended or adjusted under 35 U.S.C. 154(b) by 485 days.

(21) Appl. No.: 11/909,035

(22) PCT Filed: Mar. 16, 2006

(86) PCT No.: PCT/NO2006/000099
§ 371 (c)(1),
(2), (4) Date: Nov. 16, 2007

(87) PCT Pub. No.: WO2006/098638
PCT Pub. Date: Sep. 21, 2006

(65) Prior Publication Data
US 2008/0223760 A1 Sep. 18, 2008

(30) Foreign Application Priority Data
Mar. 18, 2005 (NO) .................................. 20051433

(51) Int. Cl.
*B07B 1/10* (2006.01)

(52) U.S. Cl. ........ 209/307; 209/309; 209/320; 209/326; 209/364

(58) Field of Classification Search ................. 209/364, 209/307, 309, 320, 326
See application file for complete search history.

(56) References Cited

U.S. PATENT DOCUMENTS 1,013,040 A * 12/1911 Morse .......................... 209/307
(Continued)

FOREIGN PATENT DOCUMENTS

FR 2768948 4/1999
(Continued)

OTHER PUBLICATIONS

Written Opinion, Jun. 9, 2006, ISA / SE

*Primary Examiner* — Kaitlin S Joerger
*Assistant Examiner* — Prasad Gokhale
(74) *Attorney, Agent, or Firm* — Gable Gotwals

(57) ABSTRACT

An apparatus and a method of screening a material containing a solid and fluid where the material is placed on an upper side of a screen element and the material is at least being acted on by vibrations produced by at least one acoustic sound source. The at least one acoustic sound source is arranged to transmit pressure waves to at least a portion of an underside of the screen element.

28 Claims, 5 Drawing Sheets

U.S. PATENT DOCUMENTS

| | | | |
|---|---|---|---|
| 2,596,281 A * | 5/1952 | O'Brien | 74/87 |
| 3,489,679 A | 1/1970 | Davidson et al. | |
| 3,490,584 A | 1/1970 | Balamuth | |
| 3,766,059 A | 10/1973 | Sasaki | |
| 3,864,249 A | 2/1975 | Wallis | |
| 4,692,240 A * | 9/1987 | Arbuthnot et al. | 209/254 |
| 4,747,920 A | 5/1988 | Muralidhara et al. | |
| 4,802,964 A * | 2/1989 | Muralidhara et al. | 204/544 |
| 5,087,379 A | 2/1992 | Morton et al. | |
| 5,151,186 A | 9/1992 | Yoo et al. | |
| 5,595,306 A * | 1/1997 | Hukki et al. | 209/325 |
| 5,653,346 A * | 8/1997 | Frei et al. | 209/254 |
| 6,024,228 A * | 2/2000 | Williams | 209/272 |
| 6,062,394 A * | 5/2000 | Bielagus | 209/320 |
| 6,079,569 A * | 6/2000 | Monteith | 209/365.1 |
| 6,220,445 B1 * | 4/2001 | Williams | 209/272 |
| 6,286,687 B1 * | 9/2001 | Schuller | 209/325 |
| 6,622,869 B1 * | 9/2003 | Riggenmann et al. | 209/307 |
| 7,022,505 B2 * | 4/2006 | Chandler et al. | 435/173.1 |
| 7,484,624 B2 * | 2/2009 | Saika | 209/307 |
| 2005/0082234 A1 | 4/2005 | Solenthaler | |
| 2007/0163924 A1 * | 7/2007 | Saika | 209/30 |

FOREIGN PATENT DOCUMENTS

| | | |
|---|---|---|
| WO | 91/03309 | 3/1991 |
| WO | WO 95/27551 | 10/1995 |

* cited by examiner

SIEVE APPARATUS AND METHOD FOR USE OF SAME

The present invention regards a sieve apparatus. More particularly, it regards an apparatus and a method for sieving or screening a material such as, but not limited to, a drilling fluid containing drilling mud and drilling particles or drill cuttings.

Separating solids from fluid flows by passing a fluid through a filtration or screening device having perforations of a size that retains the solids on the screen surface instead of passing them through, is a well known technology. Some fluid flows contain other substances that cause solids to agglomerate or adhere to each other or to a screen surface, which results in the formation of bridges across the screen openings and clogging of the screen. These problems often occur during well drilling, where a drilling fluid or "mud" is circulated into the well.

During drilling, drilling fluids are continuously circulated between the well bore and the surface in order to remove drilling particles, also called drill cuttings, from the drill bit. The drill cuttings are carried to the surface by the drilling mud, where it is separated from the drilling mud. The drilling mud is then recirculated into the well, to the drilling operation. Drilling mud is expensive, among other things, and it is therefore desirable to re-use as much of this as possible. The drilling mud is kept as clean and free of contaminants such as drill cuttings and foreign matter, as possible. Drilling mud is typically cleaned by a succession of several types of equipment, including vibratory screening devices generally termed "shale shakers".

When drilling through sections of sandstone formations, use is normally made of a drilling fluid with a viscosity so high that conventional shakers can not provide sufficient gravitational force to separate the drilling mud from the solids. This is, inter alia, because the bonding between the drilling mud and the solids, and between the drilling mud and the screen cloth in the sieve apparatus, is too strong, among other things.

It has been found that high frequency oscillations imparted to the screen cloth and the drilling materials achieve far more efficient separation of the drilling mud and the drill cuttings, and of the drilling mud and the screen cloth. Moreover, it has been found that such high frequency oscillations can be generated by one or more acoustic sources of sound such as, but not limited to, an ultrasonic source.

From Canadian patent CA 2 421 224 A1 there is known a screening device that imparts acoustic vibrations to the fluid to be screened, from one or more ultrasonic sourced. In said patent, the ultrasonic source is located on an upper side of the fluid to be screened.

There are several drawbacks associated with the above prior art.

The ultrasound source of CA 2 421 224 A1 transmits pulses to the material to be screened, and not to the screen cloth on which the material has been placed. This means that the screen cloth is to a large extent "isolated" from the ultrasound sources, and it becomes more difficult to break the bond between the screen cloth and the fluid. Also, the ultrasound sources have a much greater degree of contact with the particles of the material, which may result in more wear on the unprotected ultrasound sources.

Conventional shale shakers in which the material to be screened is carried across a screen cloth rigidly mounted in a frame vibrated by means of e.g. an offset clump weight, are very noisy and also transfer substantial vibrations to the base of the device. Because the screening effect is achieved by moving the screen cloth relative to the material that is to be screened both in the horizontal and vertical planes, the screen cloth is subject to heavy wear, thus requiring frequent replacement. This replacement of the screen cloth is a relatively time-consuming operation. If there are no alternative screening devices available the material to be screened must be placed in intermediate storage while the replacement is being carried out.

When screening drilling fluid from a petroleum well, there will be an evaporation of substances that are detrimental to health and the environment. When using shale shakers, this evaporation will occur in the immediate surroundings of the shaker, as it is impracticable to enclose the device. Thus personnel required to work by the screening device may be exposed to hazardous vapours.

The object of the invention is to remedy or at least reduce one or more of the drawbacks of prior art.

The object is achieved by features specified in the description below and in the following claims.

Positional indications herein, such as "upper" and "lower", "bottom" and, "top" or "horizontal" and "vertical", denote the position of the apparatus in the following drawings, which is also a natural, necessary or practical operating position.

In one aspect the present invention is constituted by an apparatus for sieving or screening a material containing fractions of a solid and fluid, where the material is placed on an upper side of the screen element, the material at least being affected by vibrations generated by at least one acoustic sound source, wherein the acoustic sound source is arranged to transmit pressure waves to a portion of an underside of the screen element. In this context, "underside" means that side of the screen element which is opposite of the side carrying the material being screened.

In a preferred embodiment the acoustic sound source is arranged in a container filled with a fluid. This has several advantages. Firstly, the pressure waves generated by the at least one acoustic sound source will be transferred to the fluid in the container and so propagate through the fluid, providing a larger area of contact with the underside of the screen element and the material on the screen element, thereby possibly providing a higher screening efficiency. Secondly, an improved temperature control of the acoustic sound sources may be achieved. An acoustic sound source such as, but not limited to, an ultrasound source generates a considerable amount of heat. Placing the sound source in a container of fluid that is continually replaced with fluid separated from the material being screened will cause the fluid to cool the sound source. In the event of an interruption in the fluid supply, caused by e.g. an interruption of the material supply to the screen cloth, controls may for instance switch off the power supply to the sound source and/or indicate that the screening process has become unstable.

In order to achieve the best possible transmission of the pressure waves generated by the sound source, at least a portion of the screen element is in a preferred embodiment in contact with the fluid.

In one embodiment the screen element is constituted by at least one endless belt arranged, in a manner that is known per se, to rotate about at least two rollers or drums arranged essentially in parallel and with mutual spacing. Preferably, the end portions of the rollers are coupled to a screen tensioning device that is known per se, and which is arranged to adjust the spacing between the rollers to provide selective adjustment of the tension in the screen element. In a preferred embodiment the sieving apparatus is further provided with a stationary screen element arranged to receive drilling fluid, start the screening process and transfer the material to said endless screen element for further screening.

A drive arrangement that is known per se is connected to at least one of the rollers in order to rotate this and thereby the screen element.

In a preferred embodiment two or more apparatuses are arranged to be placed so as to at least partly overlap each other in the vertical plane. In such an embodiment, each apparatus may advantageously and in a way that is known per se, be provided with screen elements having different apertures or mesh sizes, the apertures of the screen element for a lower sieve apparatus being smaller than the apertures of the screen element for an upper sieve apparatus.

In one embodiment the apparatus is further provided with at least one oscillator that is known per se, and which is preferably placed in contact with a portion of the screen element and is arranged to transmit oscillations to a portion of an underside of the screen element. Tests have shown that the at least one oscillator is effective in liberating liquid that has not been liberated from the screen element by the acoustic sound source, and which is still located on the screen element.

In a preferred embodiment the sieve apparatus is provided with a cleaning apparatus arranged to loosen particles that do not fall off the screen element when subjected to gravitational forces alone. In one embodiment the cleaning apparatus comprises nozzles from which is released a fluid jet that is directed through the screen element, preferably when this is between and in a lower portion of said rollers.

In one embodiment the sieve apparatus is provided with a sealed enclosure that provides the possibility of controlling the evaporation that will occur from the material conveyed through the sieve apparatus. In a preferred embodiment, negative pressure is created in the enclosure through use of suction, which essentially eliminates the problem of exposing personnel to health-related disadvantageous vapours.

In the following there is described a non-limiting example of a preferred embodiment illustrated in the accompanying drawings, in which equivalent or similar parts are indicated by the same reference number, and in which.

Figure 1:
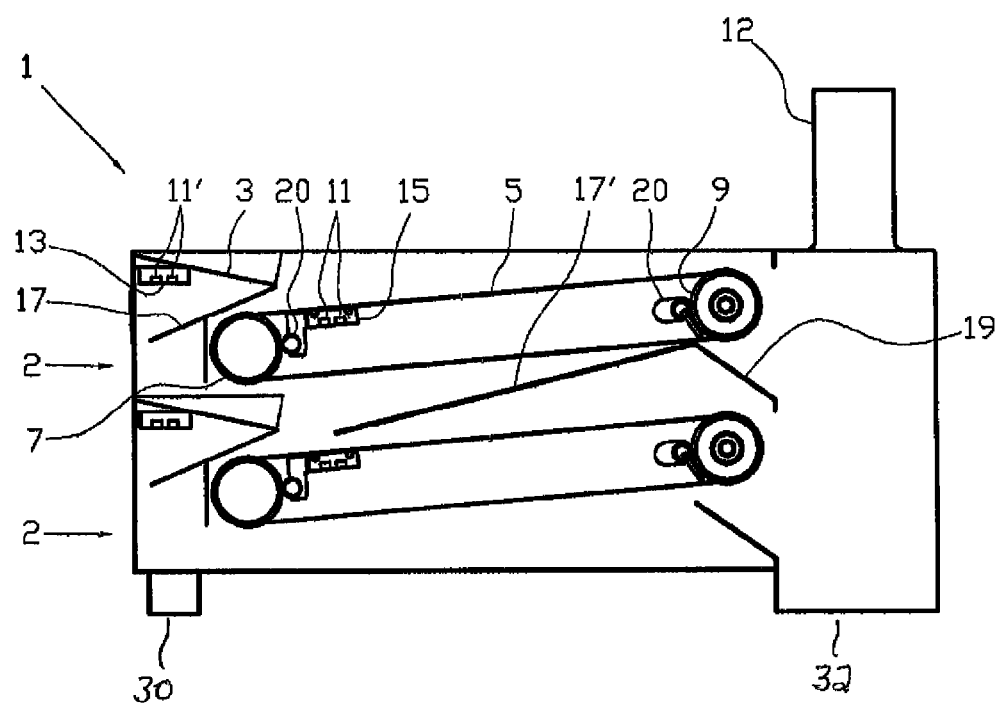
FIG. 1 is a cross-sectional view through the vertical plane of a sieve apparatus in accordance with the present invention.

In the figures, reference number 1 denotes a sieve apparatus arranged to separate e.g. drilling particles from drilling mud, and which includes two sets of screening devices 2, each of which is constituted by a stationary inlet screen cloth 3 and an endless screen cloth 5. The two screening devices 2 are arranged one above the other. Each screen cloth 5 is mounted between a first drum 7 and a second drum 9. Underneath a section of each screen cloth 3, 5 there are ultrasound sources 11 arranged in containers 13 and 15, respectively.

A person skilled in the art will appreciate that the apparatus 1 of the embodiments is illustrated by schematic drawings only, and that the apparatus in an operating situation must be connected to a control system and a power supply that are known per se. Although the apparatus 1 is shown as having two screening devices 2, it is understood that that apparatus may equally well comprise one screening device or three or more screening devices. Likewise, it is understood that one or more of the endless screen cloth(s) 5 can be replaced with fixed screen elements, across which the material to be screened is conveyed by mechanical means (not shown) or by gravity.

Figure 3:
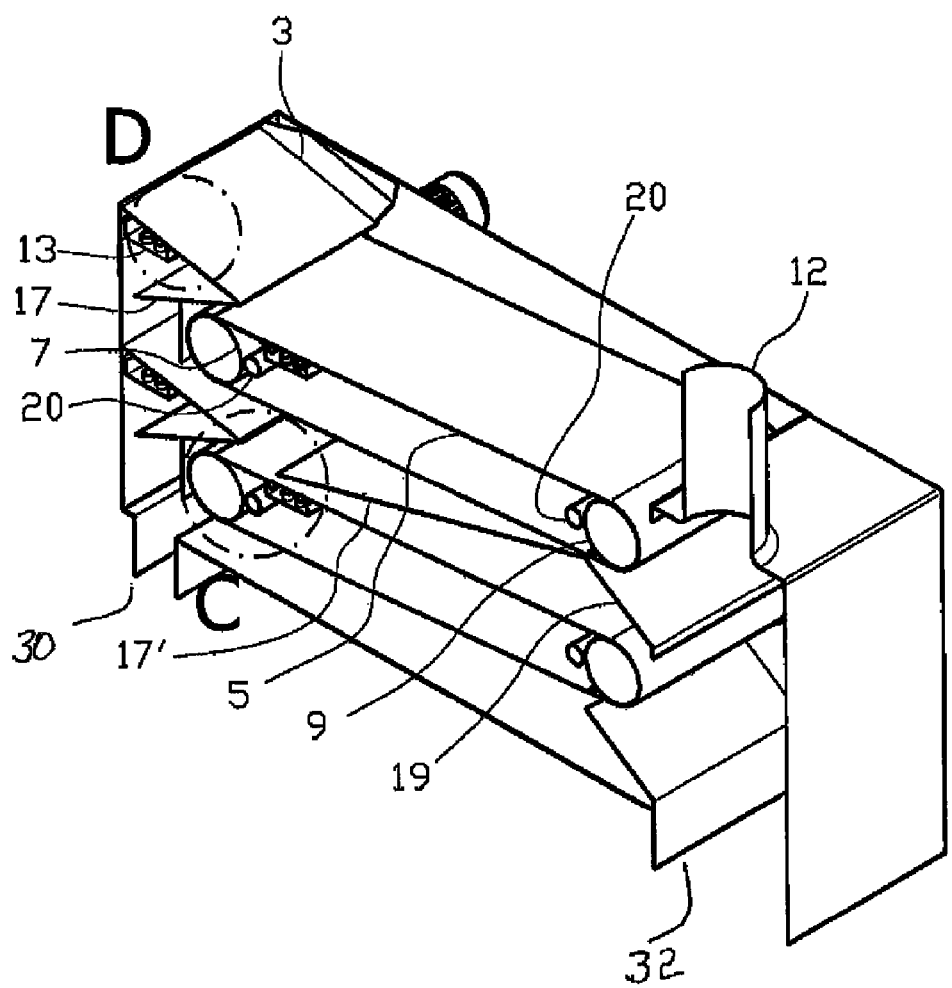
FIG. 3 is a partially sectioned view of the apparatus according to the present invention.

FIGS. 1 and 3 show a side view and a partially sectioned view, respectively, of an apparatus 1 in a configuration in which the stationary inlet screen cloth 3 is arranged to receive material containing drilling mud and drilling particles, and separate at least some of the drilling mud from the drilling particles. This is achieved by the ultrasound sources 11, which are disposed in the container 13 (see FIG. 5), generating acoustic pulses that are transmitted to the inlet screen cloth 3 and the material. Tests have shown that in this configuration, the acoustic pulses are highly effective in separating drilling mud from solids, and that an equivalent conventional shale shaker would have to generate gravitational forces in the order of 20 G, which is approximately four times greater than that which is feasible through use of conventional shale shakers. Thus, the acoustic pulses acting on the screen cloth 3 are highly effective when it comes to breaking the bonds between both drilling mud and drilling particles, and drilling mud and the screen cloth 3. The drilling mud that is liberated from the material on the screen cloth 3 and flows through this, is collected by a collecting tray 17 arranged on the underside of the inlet screen cloth 3, and which directs the separated drilling mud through outlet 30 on to further treatment (not shown) outside of the sieve apparatus 1. The drilling material is carried onwards across the endless screen cloth 5, now with a reduced content of drilling mud due to passing the inlet screen cloth 3. In a section near the first drum 7 ultrasonic sources 11 are provided in a container 15A section near the first drum 7 is provided with ultrasound generators 11 in a container 15. The ultrasound sources generate acoustic pulses that act on the screen cloth 5 and the drilling material, causing substantial parts of the drilling mud still bound to the drilling material received on the screen cloth 5 to be liberated from the particles of the drilling material, and to flow through the screen cloth 5 and be collected on a collecting tray 17', to be brought out of the sieve apparatus 1 for further treatment. The drilling material conveyed on the screen cloth from the first drum 7 to the second drum 9 falls off the screen cloth 5 at the second drum 9, and is carried out of the sieve apparatus 1 via a discharge tray 19, through outlet 32 and further to collection for transport for on-shore disposal.

Figure 4:
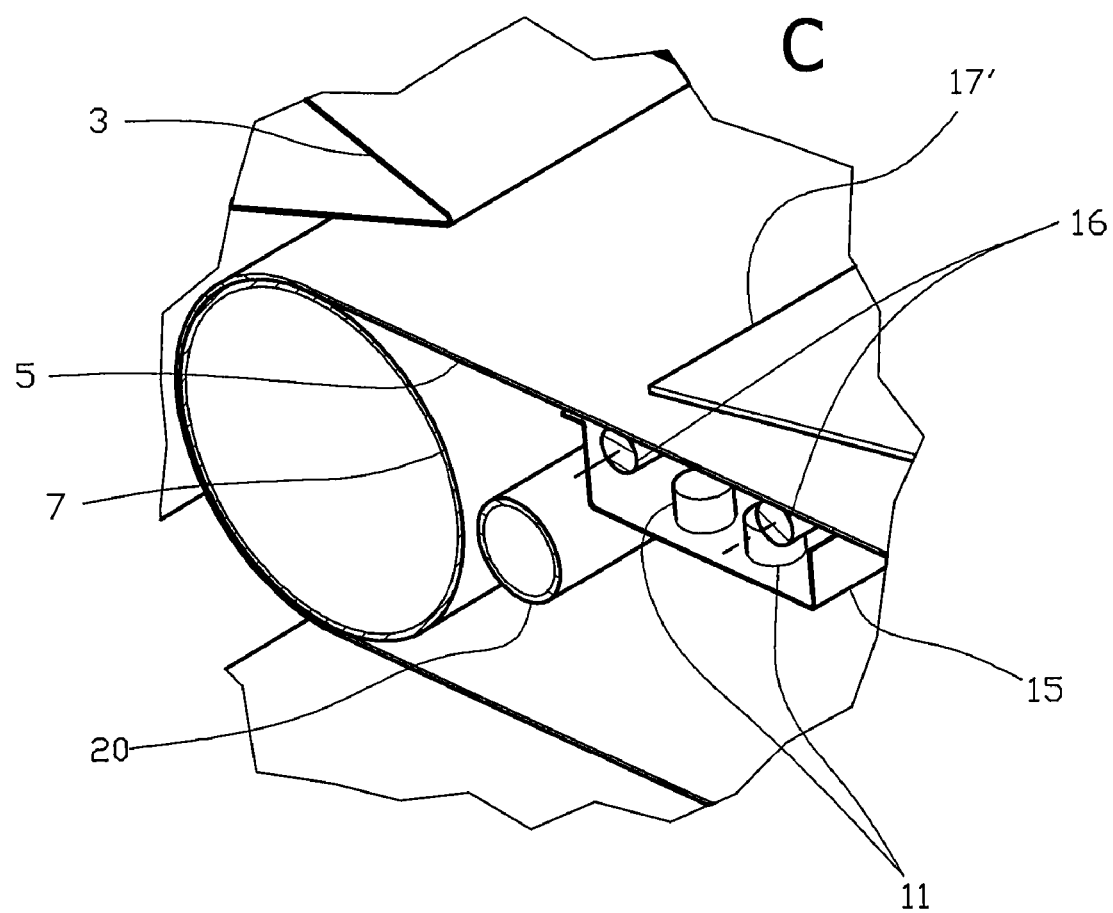
FIG. 4 is a perspective view of a portion C of the sieve apparatus in FIG. 3, on a larger scale.
Figure 5:
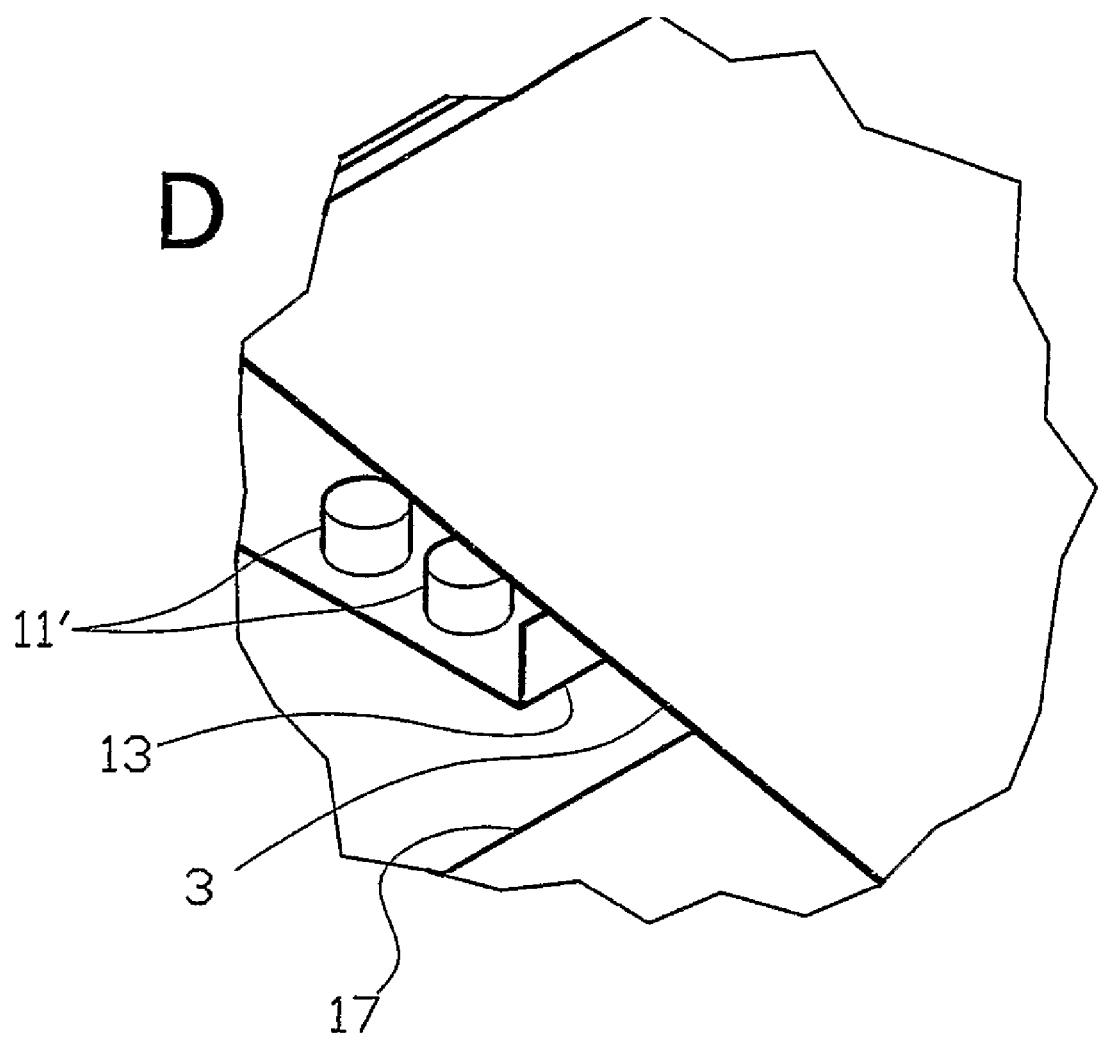
FIG. 5 is a perspective view of a portion D of the sieve apparatus in FIG. 3, on a larger scale.

As is best seen in FIGS. 4 and 5, the ultrasound sources arranged underneath both screen cloth 3 and screen cloth 5 are placed in open containers 13 and 15, respectively. The purpose of this is to fill the containers with drilling mud separated from the drilling material. This has at least two appreciable advantages: Firstly, transmitting the pulses from the ultrasound sources 11 via the drilling mud to the screen cloths 3, 5 has proven to be efficient. Secondly, the drilling mud continuously flowing into the containers 13, 15 during the sieving process provides cooling of the ultrasound sources 11. This provides a good opportunity for controlling the process; if the supply of drilling material is reduced or interrupted, the replacement of the cooling drilling mud in the containers 13, 15 will be reduced or interrupted, and consequently the temperature of the drilling mud in the containers 13, 15 will increase. By using a sensor and warning system that is known per se, the temperature of the drilling mud in the containers 13, 15 can play an important part in the monitoring and control of the sieving process.

FIG. 4 also shows two level rollers 16 rotatably arranged in the container 15. In a preferred embodiment, the level rollers are rotatably mounted (not shown) to two side walls of the container 15 and have the following purposes: To act as a liquid seal for liquid between the rollers 16, to provide a controlled distance between the underside of the screen cloth 5 and the ultrasound sources 11, and to absorb any uneven loading on the screen cloth 5.

Although the figures show only two containers 13, 15 with ultrasound sources 11 for each set of screening device 2, it is understood that the present invention also includes the use of another number than the number of containers 13, 15 with ultrasound sources 11 shown.

In FIG. 1 a cleaning apparatus in the form of cleaning nozzles 20 placed against a lower portion of the endless screen cloth 5, is indicated. The purpose of the nozzles is to direct a jet of fluid, preferably air, through a portion of the screen cloth 5 in order to liberate particulate material that has become attached to the screen cloth 5. The use of such cleaning nozzles will allow the screen cloth 5 to maintain its screening capacity to the greatest possible degree. This will not be discussed further herein, as the apparatus required to provide such cleaning nozzles 20 will be known to a person skilled in the art.

Drilling material from the drilling of a petroleum well may contain substances that are dangerous to one's health. Some of these substances are released from the drilling material during the sieving process. A great advantage of the sieve apparatus 1 in accordance with the present invention is the fact that the apparatus may be enclosed, allowing gases and vapours released during the sieving process to be collected in a controlled manner, e.g. by use of negative pressure, and carried away from the sieve apparatus for further treatment or release to the atmosphere, far from the personnel. The configuration of a negative pressure ventilation system 12 such as indicated in FIG. 1 will be known to a person skilled in the art, and as such will not be discussed in any greater detail herein.

Figure 2:
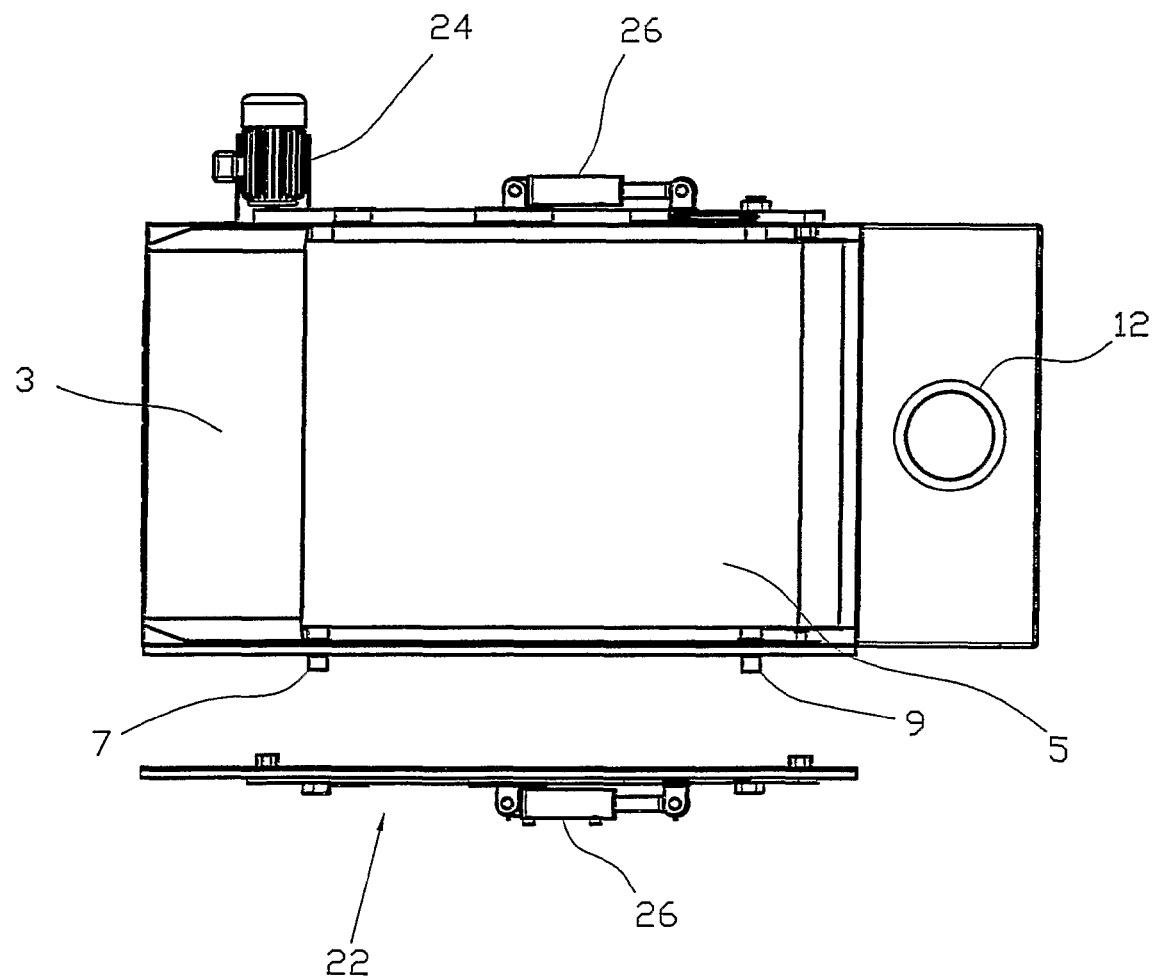
FIG. 2 is a top view of the apparatus in accordance with the present invention.

FIG. 2 shows a top view of the apparatus 1. The view shows one of the side plates 22 moved a distance away from the apparatus 1, which will be necessary when performing e.g. maintenance and replacement of the screen cloth 5. FIG. 2 also shows a driving motor 24 connected to a first drum 7. The driving motor 24 may be any of electrically, hydraulically or pneumatically driven motors. A tensioning device 26 for adjusting the spacing between the first 7 and second 9 drum, and consequently the mounting of the screen clot 5, is arranged on each of the side plates 22.

The present invention as described above provides great advantages over known screening devices. The advantages are related both to the capacity of the sieve apparatus 1 in terms of separating liquid from solids, and environmental aspects related to vibrations, noise and removal of noxious gases released from the drilling fluid during the cleaning process in the sieve apparatus 1. Tests have shown a sieve apparatus in accordance with the present invention to be capable of cleaning 2000-3000 liters of drilling fluid per minute in a satisfactory manner, which is far in excess of the capacity of known sieve apparatuses.

The invention claimed is:

1. A sieve apparatus for screening a material containing fractions of a solid material and a fluid having a liquid fraction, said apparatus comprising:
   an outlet for fractions of the solid material separated from the material, and an outlet for fluid fractions separated from the material;
   at least one screen element having an upper side and an underside;
   at least one ultrasonic source located below the at least one screen element;
   an opened top container located below the underside of the screen element such that the opened top faces the underside of the screen element; the container further configured to receive at least a part of the liquid fraction such that at least a part of the underside of the screen element contacts the liquid fraction located in the container; and
   the at least ultrasonic source being located in the container and fully submerged in the liquid separated from the material, the liquid fraction thereby acting as an ultrasonic coupler between the ultrasonic source and the screen element.

2. The apparatus according to claim 1, wherein the at least one screen element is configured as at least one endless belt movable about rollers/drums located at an upstream end and a downstream end of the screen element, respectively.

3. The apparatus according to claim 2, further comprising a cleaning device configured to clean fractions of solid material away from the screen element, the cleaning device comprising at least one fluid jet nozzle, located between the rollers/drums, and being directed towards an upper side of a lower run of the endless belt-like screen element to present at least one fluid jet through the screen element, and wherein the cleaning device is adjacent a downstream roller.

4. The apparatus according to claim 2, wherein the upstream end of the screen element is at a level lower than that of its upstream end.

5. The apparatus according to claim 2, wherein the container is provided with at least two rollers at the open end region thereof to support the movable screen and prevent the screen from physically contacting the ultrasonic source submerged in the container.

6. The apparatus according to claim 1, wherein the at least one screen element is stationary and planar, and wherein its upstream end is at a level higher than that of its downstream end.

7. The apparatus according to claim 1, comprising at least two vertically spaced screen element sets with respective associated ultrasonic sources, said sets arranged to at least partly overlap each other in a vertical direction.

8. The apparatus according to claim 1, further comprising a housing enclosing the sieve apparatus, the housing exhibiting said outlet for fractions of solid material separated from the material, said outlet for fluid fractions separated from the material, and a vent for removing from the inside of the housing noxious gases and vapours released from the material during a process of separation of fractions of fluid and solids from the material.

9. The apparatus according to claim 1, wherein the material to be screened is drill mud and drill chippings of solid material.

10. An sieving method for screening a material containing solids and fluid fractions of a solid material and a fluid having a liquid fraction, said method comprising the steps of:
    providing the material onto an upper side of a screen element having an upper side and underside;
    providing vibrations to an underside of the screen element from an ultrasonic source;
    causing at least a part of said liquid fraction to pass from said material through the screen element and into an upwardly open container facing the underside of the screen element to allow the ultrasonic source to be fully submerged in the liquid fraction, and to let the liquid fraction in the container be in contact with at least a part of the screen element to provide ultrasonic coupling between the ultrasonic source, the screen element and the material present thereon, whereby the vibrations from the ultrasonic source act on the material to enhance screening thereof; and
    allowing fluid fractions of the material to exit through the screen element towards an outlet, whereas the fractions of solid material are caused to leave the screen element at a downstream end thereof and therefrom to pass to an outlet.

11. The method according to claim 10, wherein the method is carried out inside a housing, and wherein noxious gases and vapours released from the material during a process of separation of fractions of fluid and solids from the material are removed from the inside of the housing through a vent in the housing.

12. The method according to claim 10, further comprising cleaning the screen at a downstream region of the screen element by blowing a pressurized fluid through the screen element.

13. The method according to claim 12, wherein air is used as pressurized blowing fluid.

14. The method according to claim 10, wherein the material to be screened is drill mud and drill chippings of solid material.

15. A sieve apparatus for screening a material containing fractions of solid material and a fluid having a liquid fraction, said apparatus comprising:
   an outlet for fractions of solid material separated from the material, and an outlet for fluid fractions separated from the material;
   at least one first, stationary screen device with a first planar screen element having an upper side and an underside, an upstream end of the first screen element being at a level which is higher than that of a downstream end;
   at least one second, movable screen device with a second screen element having an upper side and an underside and being configured as an endless belt movable about rollers/drums located at an upstream end and a downstream end of the second screen element, respectively, and the downstream end of the first element being above and overlapping the upstream end of the second element,
   at least one ultrasonic source located below the underside of the first and second screen elements, respectively; and
   an opened top container being located below the underside of the first and second screen elements, respectively, with the opened top facing the underside of the first and second screen elements, the container configured to receive at least a part of the liquid fraction so that at least a part of the underside of the first and second screen elements, respectively, contacts the liquid fraction located in the container; and the at least one ultrasonic source being located in the container and being fully submerged in the liquid fraction therein, the liquid fraction thereby acting as an ultrasonic coupler between the ultrasonic source and the screen element.

16. The apparatus according to claim 15, wherein the upstream end of the second screen element is at a level lower than that of the downstream end.

17. The apparatus according to claim 15, wherein the apparatus is configured to let a first fraction of fluid from the material pass through the first screen element, a second and final fraction of fluid from the material pass through the second screen element, and the fractions of solid material to leave from a downstream end of the second screen element.

18. The apparatus according to claim 15, wherein at least two vertically spaced screening devices with the associated ultrasonic sources are provided, the devices arranged to at least partly overlap each other in a vertical direction.

19. The apparatus according to claim 18, further comprising a cleaning device configured to clean fractions of solid material away from the second screen element, the cleaning device comprising at least one fluid jet nozzle, being located between the rollers, and being directed towards an upper side of a lower run of the endless belt-like screen element to present at least one fluid jet through the screen element, and wherein the cleaning device is adjacent the downstream roller.

20. The apparatus according to claim 18, further comprising a housing enclosing the apparatus, the housing exhibiting the outlet for fractions of solid material separated from the material, the outlet for fluid fractions separated from the material, and a vent for removing from the inside of the housing noxious gases and vapours released from the material during a process of separation of fractions of fluid and solids from the material.

21. The apparatus according to claim 15, further comprising a cleaning device configured to clean fractions of solid material away from the second screen element, the cleaning device comprising at least one fluid jet nozzle, being located between the rollers/drums, and being directed towards an upper side of a lower run of the endless belt screen element to present at least one fluid jet through the screen element, and wherein the cleaning device is adjacent the downstream roller.

22. The apparatus according to claim 15, further comprising a housing enclosing the apparatus, the housing exhibiting an outlet for fractions of solid material separated from the material, an outlet for fluid fractions separated from the material, and a vent for removing from the inside of the housing noxious gases and vapours released from the material during a process of separation of fractions of fluid and solids from the material.

23. The apparatus according to claim 15, wherein the material to be screened is drill mud and drill chippings of solid material.

24. The apparatus according to claim 15, wherein the container is provided with at least two rollers at the open end region thereof to support the movable screen and prevent the screen from physically contacting the ultrasonic source submerged in the container.

25. A sieving method for screening a material composed of fractions of solid material and a fluid having a liquid fraction, said method comprising the steps of:
   providing the material onto a top surface of a first, stationary, downwardly inclined screen element in a first screening device;
   at the first screening device providing vibrations to an underside of the first screen element from an ultrasonic source;
   causing at least a part of the liquid fraction to pass from said material through the first screen element and into an opened top container facing the underside of the first screen element, the ultrasonic source being fully submerged in the liquid fraction part, and the liquid fraction part in the container being in contact with at least a part of the first screen element to provide ultrasonic coupling between the ultrasonic source, the first screen element and the material present thereon, whereby the vibrations from the ultrasonic source act on the material to enhance screening thereof;
   a first part of fluid fractions of the material exiting through the first screen element towards an outlet;
   passing remains of the material from the first screen element from a downstream end thereof onto an upstream end of a second screening device exhibiting a second screen element configured as an endless belt;
   at the second screening device providing vibrations to an underside of the second screen element from an ultrasonic source;

causing at least a further part of the liquid fraction of the fluid to pass from the remains of the material through the second screen element and into an opened top container facing the underside of the second screen element, the ultrasonic source located in the opened top container being fully submerged in the further liquid fraction part, and the further liquid fraction part in the container being in contact with at least a part of the second screen element to provide ultrasonics acting as a coupling between the ultrasonic source, the second screen element and the remains of the material present thereon, whereby the vibrations from the ultrasonic source act on the material remains to enhance screening thereof; and the fluid fractions of the material remains exiting through the second screen element towards the outlet, whereas the fractions of solid material leave the second screen element at a downstream end thereof and therefrom to pass to the outlet.

26. The method according to claim 25, wherein the method is carried out inside a housing, and wherein noxious gases and vapours released from the material during a process of separation of fractions of fluid and solids from the material are removed from the inside of the housing through a vent in the housing.

27. The method according to claim 25, further comprising cleaning the second screen element at a downstream region thereof by blowing a pressurized fluid through the screen element.

28. The method according to claim 25, wherein the material to be screened is drill mud and drill chippings of solid material.

* * * * *